UNITED STATES PATENT OFFICE.

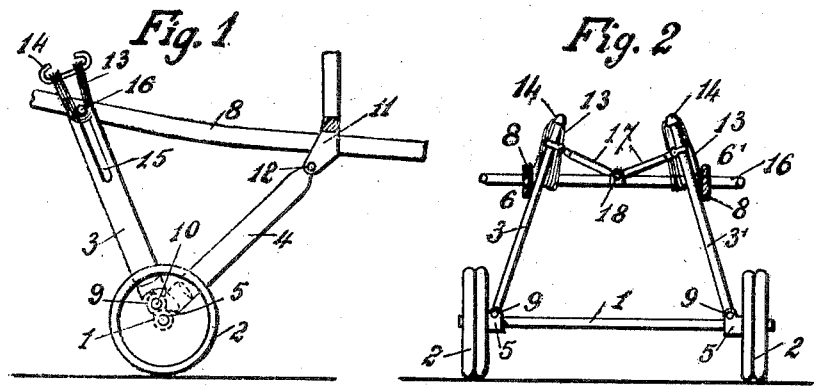
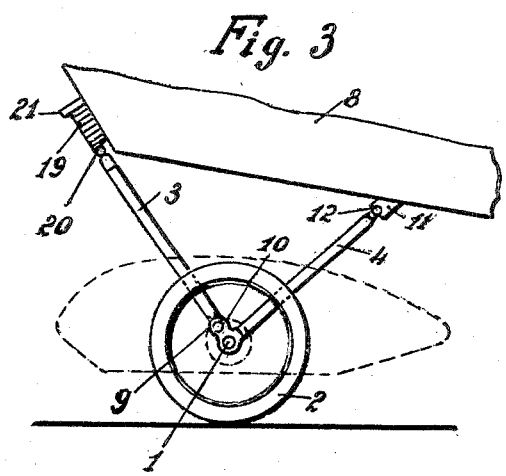
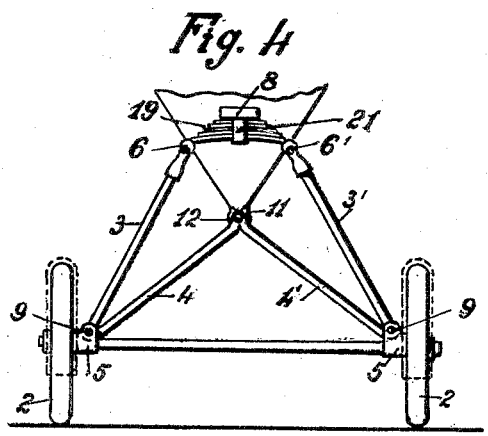

GIANNI CAPRONI, OF MILAN, ITALY.

LANDING-CARRIAGE FOR FLYING-MACHINES.

1,345,833.    Specification of Letters Patent.    Patented July 6, 1920.

Application filed April 22, 1919. Serial No. 292,002.

*To all whom it may concern:*

Be it known that I, GIANNI CAPRONI, engineer, subject of the Kingdom of Italy, residing at Milan, Via Durini No. 24, Italy, have invented certain new and useful Improvements in Landing-Carriages for Flying-Machines, of which the following is a specification.

The present invention relates to landing carriages for flying machines.

The invention has for its primary object to provide a device of the above mentioned character wherein improved means are employed for connecting the carriage to the fuselage of the machine so as to absorb shocks likely to be transmitted to the fuselage on the landing of the machine and in addition consists in the arranging of the parts of the carriage so as to effect a proper balancing thereof.

With this end in view the carriage comprises an arrangement of stayrods separately associated with the axle and elastically and universally connected with the fuselage.

The annexed drawing represents by way of example two forms of the construction of the invention.

Figures 1, 2 are respectively a side view and a front view of a landing carriage.

Figs. 3, 4 are respectively a side view and a front view of the second form of landing carriage.

The landing carriage comprises an axle —1— bearing the wheels —2—; the stays —3—3'— pivoted at their lower ends —9— through ball and socket joints —10— to turnable rings —5— mounted on the end of axle —1—, said stays being inclined one toward the other as well as with respect to a vertical plane passing through the axle —1—. The upper ends of said stays are connected to the fuselage through universal elastic joining means, as will be hereinafter described.

In the construction shown in Figs. 1, and 2, the longitudinals —8— are connected to one another by means of a transverse bar —16— which passes through slots —15— in said stays. The upper head of said stays are provided with stirrups —14— over which pass the caoutchouc cables —13—, wound on bar —16—. The rods —17— are pivoted at their ends respectively on central bracket —18— of bar —16— and on the head portions of stays —3—3'—.

The rear stays —4— are connected at their lower ends to the rotatable rings —5— while their upper ends are connected to the fuselage frame through ball and socket joints —12— the sockets being fastened on brackets —11— depending from said frame.

A ball and socket connection —12— is provided between the upper ends of rear stays —4— and the longitudinals —8—, the sockets being fastened on a bracket —11—.

In the form of construction represented in Figs. —3—4— the upper ends of stay rods —3—3'— are pivotally connected to the ends of a laminated spring —19— by means of ball and sockets —6—6'— said spring being fastened by stirrups —21— to the central longitudinal —8— of the flying machine.

The stay rods —4—4'— have a common socket and ball connection —11—12— with the under portion of the aeroplane frame.

Having now particularly described my invention and the manner in which the same should be performed I claim:—

1. In a flying machine having a fuselage frame, a landing carriage comprising a wheel axle, rotatable rings at the ends of said wheel axle, two rear stay rods connected at their lower ends to said rings and inclined to one another as well as in respect of a vertical plane passing through said axle, ball and socket connections between the upper ends of said rods and with the fuselage frame, two fore stay-rods joined at their lower ends by ball and socket connections to said rings, said rods being inclined to one another as well as in respect to a vertical plane passing through the axle, elastic universal connections between the upper ends of the latter mentioned rods and the fuselage frame.

2. In a flying machine having a fuselage frame, a landing carriage comprising a wheel axle, rotatable rings at the ends of said wheel axle, two rear stay rods connected at their lower ends to said rings and inclined to one another as well as in respect of a vertical plane passing through said axle, ball and socket connections between the upper ends of said rods and the fuselage frame, two fore stay rods joined at their ends by ball and socket connections to said rings, said rods being inclined to one another as well as in respect to a vertical plane passing through the axle, the end sections of the rods being provided with longitudinal slots, stirrups on the heads of said sections; a transverse bar depending from the fuselage frame, elastic bands wound on said bar and passing over said stirrups, other rods arranged respectively between a point of said transverse bar and the end sections of said fore stayrods and ball and socket connections interposed in said last mentioned rods.

In testimony whereof I affix my signature in the presence of two witnesses.

GIANNI CAPRONI.

Witnesses:
G. G. GUANINI,
E. C. BURKE.